United States Patent Office 3,451,771
Patented June 24, 1969

3,451,771
PREPARATION OF FERROMAGNETIC CrO₂ BY HEATING CrO₃ IN THE PRESENCE OF O₂ AND Cr₂O₃
Norman L. Cox, Claymont, and William T. Hicks, Wilmington, Del., assignors to E. I. du Pont de Nemours and Company, Wilmington, Del., a corporation of Delaware
No Drawing. Filed Oct. 27, 1966, Ser. No. 589,862
Int. Cl. C01g 37/02; H01f 1/34
U.S. Cl. 23—145                         5 Claims

ABSTRACT OF THE DISCLOSURE

Preparation of ferromagnetic $CrO_2$ by heating $CrO_3$ at 0.5–5 atmospheres and at 200–350° C. in the presence of oxygen and chromium sesquioxide, the sesquioxide being made by drying chromium (III) hydroxide or hydrated chromium sesquioxide at 200–650° C.

---

This invention relates to a novel process for preparing ferromagnetic chromium dioxide. More particularly, it relates to a process for preparing ferromagnetic chromium dioxide at atmospheric pressure.

Various preparations of ferromagnetic chromium oxide are known to the art. In the prior art, several methods for preparing the magnetic oxide and modified oxides are presented; however, most of these methods require the employment of high pressure equipment suitable for pressures up to about 3000 atmospheres while the preferred pressure ranges required for these techniques is in the range of about 200–500 atmospheres. The most commonly employed procedure requires the decomposition of chromium trioxide, $CrO_3$, in aqueous media at pressures ranging from 200–3000 atmospheres and temperatures ranging from 200–500° C. as is exemplified in several U.S. patents such as U.S. Patents 2,885,365, 2,923,684, 2,923,685, 2,956,955, 3,034,988, 3,068,176 and 3,278,263.

Other methods of preparing ferromagnetic $CrO_2$ are found in U.S. Patents 3,074,778 and 3,078,147 wherein chromyl chloride is decomposed on substrates of fibrous inorganic materials or on high purity chromium dioxide at atmospheric pressure in oxygen at a temperature ranging from 300–500° C. Still another procedure for producing ferromagnetic chromium dioxide is taught in U.S. Patent 3,117,093 wherein higher oxides of chromium of the general formula $Cr_xO_y$ wherein the ratio of $2y$ to $x$ ranges between 4 and 6 and wherein the preferred ratio is 4.1 to 5.5 are heated in aqueous acid media at pressures ranging between 50 and 3000 atmospheres at temperatures of 250–500° C.

With the discovery of a ferromagnetic chromium dioxide, having suitable magnetic properties and uniform small particle size which make it useful in the manufacture of magnetic recording tapes, magnetic memory recorders, or for computers, gyrator elements and so forth, there arose the need for alternate, less-expensive techniques for its manufacture. Oxides of chromium, having ferromagnetic properties, are described in U.S. Patent 2,956,955 to Arthur and consist of essentially uniform, small particles of tetragonal crystal structure, whose average length is not more than 10 microns with no more than 10% of the particles being longer than 10 microns and having a particle length-to-width ratio ranging from 2:1 to 6:1. These particles contain 58.9–61.9% chromium and exhibit an X-ray diffraction pattern which analysis shows to correspond in its entirety to a tetragonal crystal structure having cell constants of $a_0=4.41\pm0.10$ A. and $c_0=2.90\pm0.10$ A.

The process of this invention provides for the low pressure production of ferromagnetic $CrO_2$. This process comprises heating chromium trioxide, at atmospheric or slightly higher pressures and temperatures from about 200 to 350° C., in the presence of oxygen and chromium sesquioxide with the proviso that the chromium sesquioxide is prepared by drying chromium (III) hydroxide or hydrated chromium sesquioxide at a temperature between 200 to 650° C. The chromium (VI) oxide and chromium (III) oxides are mixed together in molar ratios of from 1:1 to 16:1 and the mixture is heated in the presence of oxygen for preferably 3 to 44 hours at 200 to 300° C.

Normally reagent grade chromium trioxide is available which is pure enough for the reaction to take place; however, commercial grade chromium trioxide containing minor impurities such as iron, nickel and silica can be used without interfering with the reaction. As a matter of fact, quantities of modifying agents such as iron and other transition elements, antimony, tellurium and alkali metals as described in U.S. Patents 2,885,365, 2,923,683, 2,923,684, 3,034,988 and 3,068,176 can be used. Of these, iron is preferred; however, tellurium can also be employed and is preferably used in the form of tellurium oxide or telluric acid. The proportion of modifier employed is as described in the above-mentioned patents, and ranges from 0.008% by weight based upon the total chromium oxide available in the reaction mixture up to 25% for materials such as antimony. Usually the proportions of modifier will be below 14% and preferably below 5%. If desired, the modifying agents can be incorporated during the preparation of the chromium sesquioxide as described below.

The $Cr_2O_3$ necessary for the process of this invention is obtained by precipitating from aqueous solutions of chromium salts, for example, the nitrates, chlorides, sulfates, and other like materials, by the addition of a base, for example, a hydroxide or carbonate of the alkali metals or, in particular, ammonia as a gas or in aqueous solution. The gelatinous precipitate of $Cr_2O_3$ hydrate is normally filtered and washed. It is dried at temperatures around 200° C. for storage and is normally further dried by heating at temperatures up to about 650° C. prior to its incorporation in the reaction mixture. In many instances the freshly filtered precipitate is dried at about 200° C. for about 4 hours and then calcined at about 400–500° C. for 3 hours prior to use. Normally, materials dried in the range of 200–600° C. range from green to brown to black as the temperature increases; however, as the temperature goes above 650° C., the material again returns to its green color. The $Cr_2O_3$ that is normally sold in commercial quantities is calcined at temperatures in the range from 650 to 1200° C. and has been found unsatisfactory in the practice of this invention. The reactive high surface area $Cr_2O_3$ formed by low temperature calcination has been found to be the most suitable material employable in the reaction of this invention.

Freshly precipitated chromium (III) oxide hydrate or chromium hydroxide is gel-like in character, and can be readily converted to a colloidal dispersion, for example, by peptizing with chromium (III) chloride. Like other gels, chromium oxide hydrate is strongly surface active. When precipitated from solutions containing alkalis it is, therefore, apt to contain considerable quantities of adsorbed alkalis which act as modifiers for ferromagnetic $CrO_2$ and can be incorporated in the material as modifiers by this technique.

In preparation of Cr(IV) oxide having ferromagnetic properties according to this invention, various molar ratios of Cr(VI) oxide ($CrO_3$) are mixed with chromium sesquioxide ($Cr_2O_3$) prepared as described above. The oxides are intimately mixed using conventional devices for mixing materials such as drum rollers for larger scale quantities and shaker-type blenders for laboratory quantities of materials. More commonly a drum roller or a ball mill is used to blend and grind the above-described oxides together in desired proportions. The solid blend is then placed into a suitable reactor which is resistant to oxdation and corrosion at the temperatures and conditions of the oxygen atmosphere. Molar ratios of chromium trioxide to chromium sesquioxide, that is, $CrO_3/Cr_2O_3$ mole ratios of 1:1 to 16:1 have been employed with suitable results; however, when ratios of 3:1 to about 8:1 are employed, material containing over 35% chromium dioxide is obtained. With ratios of about 3:1 to 5:1 maximum yields ranging from 60 to 70% chromium dioxide are obtained.

Satisfactory conversion to chromium dioxide takes place at temperatures ranging between 200–300° C.; however, the preferable temperature for maximum conversion appears to be in the range of 240° to about 260° C. or thereabout. The pressure within the reactor is generally in the range of 0.5 to 5 atmospheres. Preferably the reaction takes place under reaction conditions of excess oxygen which is added to the reaction chamber; however, the reaction will give adequate results when run in the presence of normal atmospheric oxygen.

Electron micrograph inspection of the materials indicates that some particles are ribbon-like while other are very fine and non-acicular particles. Still other particles are needle-like or acicular with widths of about 0.6 micron and lengths up to 5.2 microns. One can separate the acicular chromium dioxide crystals from the finer unreacted $Cr_2O_3$ particles and unreacted chromium trioxide by magnetic separation techniques.

Washing the final product in water followed by decantation is another method which can be employed for partial separation of fine particles and chromates from the acicular ferromagnetic particles.

Magnetic properties which are particularly important and which render the products of the above reaction useful in a variety of applications are the intrinsic coercive force $H_{ci}$, saturation magnetization per gram or Sigma value, $Sigma_s$, and the remanence ratio, $Sigma_r/Sigma_s$ that is, the ratio of the retentivity or remanence per gram to the saturation per gram. Retentivity and saturation are defined on pages 5–8 of Bozorth's "Ferromagnetism," D. Van Nostrand Co., New York, 1951. The sigma values given herein are determined in a 4400-oersted field on apparatus similar to that described by T. R. Bardell on pages 226–228 of "Magnetic Materials in the Electrical Industry," Philosophical Library, New York, 1955. The definition of intrinsic coercive force $(H_{ci})$ is given in "Special Technical Publication No. 85 of the American Society for Testing Materials," entitled, "Symposium of Magnetic Testing," 1948, pages 191–198. The values for intrinsic coercive force given herein are determined in a D.C. ballistic-type apparatus which is a modified form of the apparatus described by D. Davis and H. Hartenheim in the "Review of Scientific Instruments," volume VII, page 147, 1936.

The process of this invention is illustrated by the following examples in which quantities are expressed in parts by weight.

Example

The technique for manufacturing the hydroxide which has proven most satisfactory is as follows:

First, a chromium salt, for example, chromium nitrate-nonahydrate, is dissolved at room temperature in deionized water in a ratio of about 2 lb./gal. in a non-corrosive tank, for example, a glass or ceramic, or plastic-lined metal tank, until complete solution is obtained. The precipitating aqueous ammonia is introduced quickly to the agitated solution of chromium salt as a solution which contains between 10% and 16% by weight ammonia. This addition is carried out in less than 30 seconds and preferably between 10 and 25 seconds. The precipitate is agitated for 10 minutes to ½ hour and the pH then adjusted if necessary to a value in the range of 8.5–9. Normally, however, if precipitation is carried out with sufficient ammonia, a pH range of 8.8–8.85% is obtained. Differences in the specific lots of chromium salts may require more or less ammonium hydroxide. After the pH adjustment, agitation is continued for ½-2 hours prior to filtration. Filter presses and filter crocks are suitable for separating the precipitate. In order to effect more rapid filtration, a coagulating agent such as is obtained from Dow Chemical Corporation under the trade name "Separan NP–10" (polyacrylamide, mol. wt. about 1,000,000) can be used. Similar coagulating and filtration agents obtained under other trade names are suitable and are apparent to those familiar with the art. The filter cake is then washed with deionized water to remove solubles and excess ammonia. The washed cake is placed in a rotary drier or in drying trays and loaded into a suitable furnace which can be regulated at temperatures between 200 and 600° C. Normally, the material is satisfactory for use after drying at 400 to 450° C. for a period of 6 hours. The material is then cooled and stored until needed in moisture-proof bags, such as polyethylene bags.

A representative procedure is carried out as follows:

One hundred eighty-five gallons of deionized water is placed into a 267-gallon polyethylene-lined tank, 39 inches in diameter by 53 inches deep, outfitted with a ⅓ horse power propeller mixer having two 9-inch propeller blades turning at 350 revolutions per minute. Into this tank there is placed, with the mixer running, 336 lbs. of chromium nitrate-nonahydrate which dissolves over a period of 4 to 8 hours with agitation. Into a 55-gallon polyethylene-lined drum containing 206 lbs. of deionized water is placed 168 lbs. of commercial 29% aqueous ammonia. The ammonia solution is dumped into the chromium nitrate solution in a period of about 3–10 seconds, until the slurry appears uniform. Agitation is continued for 10 minutes whereupon the pH is measured and adjusted if necessary by addition of ammonium hydroxide. The slurry is then agitated for one hour after which 2.4 gallons of 1 weight percent Dow "Separon NP–10" solution may be added if desired. The material is then pumped to a filter press having ten 2-inch frames and thereafter washed with 150 gallons of deionized water. The cake is removed and placed in 3-inch-deep stainless steel trays, which are loaded in two layers with a 1-inch space between the trays into a muffle furnace at 400° C. and held for 6 hours. The dried material is brownish-black in color and in the form of hard lumps.

Molar ratios, as described in the following tables, of chromium trioxide and chromium sesquioxide, prepared as just described, are prepared by mixing the solids in a mixing device such as a shaker tube or drum roller until intimate mixtures of the reactants are obtained. The mixed oxides are placed in platinum, stainless steel, nickel or high nickel alloy tubes resistant to corrosion under the conditions of the reaction. The loaded tubes are placed in a furnace and the atmosphere in the tubes is displaced with oxygen from a tank. In some cases to avoid explosive hazards, sample sizes are limited to a few grams and heated initially at a rate of 50° C. per hour from about 100° C. to the final heating temperature.

All measurements of magnetic properties are made according to the techniques described previously. Analyses for chromium are conducted by wet chemical techniques and through indirect techniques relying on the specific magnetization. Thus, the content of chromium dioxide in samples is estimated by assuming that $Sigma_s$ for a pure material in a 4400 oersted field is equal to 90 emu per gram and that the measured $Sigma_s$ value is directly proportional to the weight percent of chromium dioxide in the sample. All the reactions are run in open vessels within the furnace and are considered as being at atmospheric pressure. Dry oxygen gas is passed continuously into the reaction tube at a rate such that the atmosphere over the reaction mixture is displaced by oxygen at least once every 5–7 minutes.

After reaction, the samples are washed several times with distilled water. Each time the rinse water is decanted off while the more magnetic portion of the material is retained in the vessel using a small permanent magnet. The results of these examples are shown in Tables I and II which follow.

takes place at atmospheric pressure.

4. A process as defined in claim 2 where said heating takes place between 3 to 44 hours at 200–300° C.

5. A process as defined in claim 1 where the molar ratio of said chromium trioxide to chromium sesquioxide is from 3:1 to 8:1.

TABLE I

[$CrO_3$–$Cr_2O_3$ reaction as a function of molar ratio in $O_2$ at 220° C.]

| No. | $CrO_3$–$Cr_2O_3$ ratio | Time, hrs. | Wt. loss (percent of $CrO_3$) | $H_{ci}$ (Oe) | $\sigma_s$ (emu/gm.) | $\sigma_r$ (emu/gm.) | $CrO_2$ content (wt. percent) |
|---|---|---|---|---|---|---|---|
| A | 1 | 3 | 14.9 | 141 | 21.7 | 3.87 | 24 |
| B | 2 | 5 | 12.8 | 169 | 31.6 | 6.60 | 35 |
| C | 4 | 20 | 15.1 | 127 | 56.5 | 11.20 | 63 |
| D | 8 | 16 | 11.4 | 138 | 43.1 | 8.12 | 47 |
| E | 16 | 44 | 10.8 | 116 | 30.7 | 4.7 | 34 |

TABLE II

[$CrO_3$–$Cr_2O_3$ reaction as a function of temperature 16 moles $CrO_3$/1 mole $Cr_2O_3$]

| No. | Time, hrs. | T. (° C.) | Wt. loss (percent of $CrO_3$) | $H_{ci}$ (Oe) | $\sigma_s$ (emu/gm.) | $\sigma_r$ (emu/gm.) | Percent $CrO_2$ |
|---|---|---|---|---|---|---|---|
| I | 44 | 220 | 10.8 | 116 | 30.7 | 4.7 | 34 |
| J | 30 | 250 | 15.6 | 149 | 37.8 | 6.9 | 42 |
| K | 6 | 275 | 15.5 | 148 | 34.5 | 6.3 | 38 |
| L | 2 | 300 | 17.9 | 141 | 35.0 | 6.2 | 39 |

What is claimed is:

1. A low-pressure process for preparing ferromagnetic chromium dioxide which comprises heating chromium trioxide at a pressure of about 0.5 to 5 atmospheres and a temperature of about 200 to 350° C. in the presence of oxygen and chromium sesquioxide, said chromium sesquioxide having been prepared from a gel of chromium hydroxide or chromium sesquioxide hydrate by drying said gel at a temperature of 200 to 650° C. at substantially atmospheric pressure, and thereafter separating the ferromagnetic chromium dioxide from the heated mixture.

2. A process as defined in claim 1 where the molar ratio of said chromium trioxide to chromium sesquioxide is from 1:1 to 16:1.

3. A process as defined in claim 2 where said heating

References Cited

UNITED STATES PATENTS

| 3,034,988 | 5/1962 | Ingraham et al. | 252—62.51 |
| 3,117,093 | 11/1964 | Arthur et al. | 23—145 |
| 3,278,263 | 10/1966 | Cox | 23—145 |

OSCAR R. VERTIZ, *Primary Examiner.*

HOKE S. MILLER, *Assistant Examiner.*

U.S. Cl. X.R.

252—62.51